(12) United States Patent
Smith

(10) Patent No.: US 6,282,894 B1
(45) Date of Patent: Sep. 4, 2001

(54) ENGINES DRIVEN BY LASER KINETIC COOLING

(76) Inventor: David C. Smith, 44 Candlelight Dr., Glastonbury, CT (US) 06033

( * ) Notice: Subject to any disclaimer, the term of this patent is extended or adjusted under 35 U.S.C. 154(b) by 0 days.

(21) Appl. No.: 09/346,721

(22) Filed: Jul. 2, 1999

(51) Int. Cl.[7] ........................................... F01K 3/00
(52) U.S. Cl. ................................... 60/509; 60/515
(58) Field of Search ........................ 60/508, 509, 515

(56) References Cited

U.S. PATENT DOCUMENTS

| | | | |
|---|---|---|---|
| 4,452,047 | * | 6/1984 | Hunt et al. ........................ 60/509 X |
| 5,095,699 | * | 3/1992 | Blackshear ........................ 60/508 X |
| 5,186,001 | * | 2/1993 | Muntz et al. ..................... 60/509 X |

* cited by examiner

Primary Examiner—Hoang Nguyen
(74) Attorney, Agent, or Firm—M. P. Williams

(57) ABSTRACT

A confined gaseous mixture of carbon dioxide and nitrogen is irradiated with a carbon dioxide laser which excites a significant portion of the gas to vibrational energy levels, thereby reducing the translational energy and therefore the temperature of the gas. The gas is adiabatically compressed, and then allowed to relax so that the temperature of the compressed gas increases. The high temperature, compressed gas is then expanded through a turbine or in a cylinder which drives an external device, such as vehicle propulsion apparatus or an electric generator, thereby to perform work. The process may occur in engines having one or more closed cylinders, or in turbocompressors.

29 Claims, 13 Drawing Sheets a. INTAKE  b. COMPRESSION  c. POWER or WORK  d. EXHAUST

LEGEND:

1-2 COOLING-LASER PULSE
2-3 COMPRESSION
3-4 VIBRATIONAL TO TRANSLATIONAL
4-1 EXPANSION-WORK

CO₂-N₂ FLOW

ENGINES DRIVEN BY LASER KINETIC COOLING

TECHNICAL FIELD

This invention relates to engines, such as reciprocating engines and gas turbine engines driven by kinetic cooling resulting from absorption of laser radiation.

BACKGROUND ART

All motors and engines that perform useful work consume energy in one form or another. The energy used by an engine may be used in the same form as provided by the energy source, or may be utilized in a form converted from the energy source. For instance, even though some devices respond directly to sunlight, solar energy usually is harnessed by converting sunlight energy into electrical energy, and then utilizing the electrical energy to drive the engine. Some energy sources, such as solar, hydro and geothermal, are practically inexhaustible, while all more commonly used energy sources, particularly fossil fuels and derivatives thereof, are irreversibly depleted when used. The cost of putting a load into Earth orbit is about $40,000 per pound; therefore, a gallon of fossil fuel costs about $320,000 in space. As an example, while energy in many satellites is provided by the sun, most space vehicles utilize depleting energy sources, such as hydrogen and oxygen, to perform necessary work, such as generating electricity by means of fuel cells. To derive one megawatt of power from the sun requires a solar collector of 10,000 square meters (about twice the size of a football field). Similarly, in extremely remote areas having harsh topography, such as the Ural mountains or the Himalayas, the provision of reliable energy sources to perform work in isolated instances is formidable. Although pipes to supply fluidic fuel or wires to supply electrical power may be utilized, in many cases this is entirely impractical. Ocean-going vessels carry expensive fuel that accounts for a significant fraction of their tonnage. Equipment operating in space has an additional disadvantage related to the inefficiency of heat rejection because the only available technique is radiative heat rejection, which requires very large areas, just as do solar collectors.

DISCLOSURE OF INVENTION

Objects of the invention include provision of engines in which the on-site working fuel is not depleted, and the energy may be provided from an extremely remote source; engines which are not connected to an energy source by wires or pipes; engines which can be operated in the atmosphere, stratosphere or space in response to energy sources on earth; engines in which no heat rejection is required, and engines which can be operated in extremely remote, basically unaccessible regions without expending fuel on site.

According to the present invention, a confined gas, such as a mixture of carbon dioxide and nitrogen, is utilized as fuel, the energy in the fuel being supplied by absorption of laser radiation, such as 10.6 micron wavelength radiation from a carbon dioxide laser or radiation from quantum cascade laser diodes. The gas mixture is kinetically cooled by absorption of laser radiation, following which the gas undergoes adiabatic compression, and then it is allowed to warm up over a period of time, after which it performs work, such as on a piston or a turbine blade, in an adiabatic expansion, returning the gas to its original state. The absorption of laser radiation converts energy within the gas from thermal translational (thermal) energy into vibrational energy levels of the carbon dioxide and nitrogen, thus causing the gas to cool. When the vibrational energy levels relax, and the energy is again converted into translational energy, the gas is heated to an elevated temperature. The energy source is the laser which can be located as much as hundreds of thousands of miles from the engine, and the fuel on site, within the engine (the $CO_2/N_2$ mixture) is used over and over again, and is never depleted. No waste heat has to be dissipated as in an ordinary engine controlled by the Carnot cycle.

According to the invention in one form, the gas, such as a mixture of carbon dioxide and nitrogen, is within a cylinder having a piston which recedes during the adiabatic expansion and advances into the cylinder during the adiabatic compression, and the energy is provided by pulses of laser radiation applied before the compression cycle. In accordance with the invention in another form, the engine is a turbine driven compressor in which the gas is cooled by absorption of laser radiation, is compressed to a higher pressure in the compressor, is allowed to relax and undergo an increase in temperature in a so-called "combustor" segment, and is then expanded in a turbine producing useful work in what may be called a "power cycle" or a "work cycle", and the gas thereby returns to its initial state so the process may be repeated. The present invention utilizes, for example, the inverse of the laser transition in the carbon dioxide molecule to absorb laser light from the energy source, which is stored in the vibrationally excited upper laser level (001 level) of $CO_2$ and the $v_1$ level of $N_2$. Because of the lifetime of the states and the kinetics leading to vibrational thermal equilibrium, the gas is actually cooled as the translational energy of the gas is converted into vibrational energy of the gas. When released, the stored vibrational energy being converted back to translational energy (heat) corresponds to the combustion leg of an Otto cycle or a Brayton cycle, which can be preceded by a compression portion of the cycle and followed by a work portion of the cycle.

Other objects, features and advantages of the present invention will become more apparent in the light of the following detailed description of exemplary embodiments thereof, as illustrated in the accompanying drawing.

BEST MODE FOR CARRYING OUT THE INVENTION

The effect of kinetic cooling due to the absorption of 10.6 micron carbon dioxide laser radiation in carbon dioxide-nitrogen mixtures is described in Gebhardt, F. G. and Smith, D. C. "Kinetic Cooling of a Gas By Absorption of $CO_2$ Laser Radiation" Applied Physics Letters, Vol. 20, No. 3, Feb. 1, 1972, p. 129.

Figure 1:
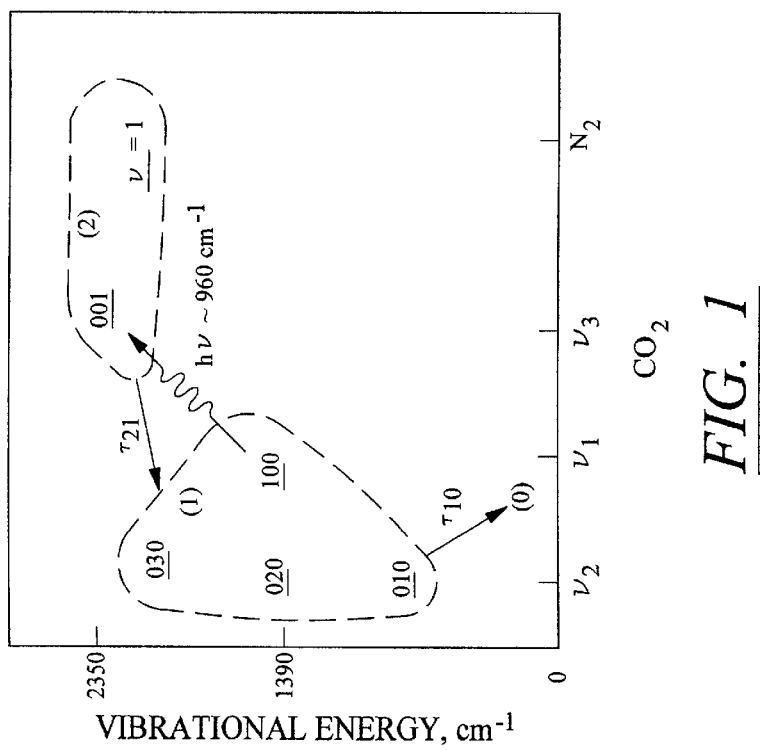
FIG. 1 is a simplified diagram of vibrational energy levels in a carbon dioxide-nitrogen gas mixture.

This is best understood by referring to FIG. 1, where the energy levels of the $CO_2$—$N_2$ mixture are divided into three groups: group (0) is the ground state atoms, group (1) is the bending ($v_2$) level and symmetric stretch ($v_3$) level of $CO_2$ which includes the lower level (100) of the $CO_2$ transition; group (2) consists of the upper level (001) of the laser transition of $CO_2$ and the first vibrational level v=1) of $N_2$. The absorption of a $CO_2$ laser photon results in a depletion of a 100 vibrational molecule and a population of a 001 vibrationally excited molecule which rapidly establishes equilibrium with the v=1 level of $N_2$ and the combined state collisionally relax at a rate equal to $T_{21}^{-1}$. Group (1) which has now been depleted by the absorption process, is restored to vibrational thermodynamic equilibrium either through the ground state translational energy or the collisional deactivation of group (2) at the $T_{21}$ rate. If $T_{10}$ is less than $T_{21}$, then the vibrational equilibrium is reestablished at the expense of translational energy and the gas is cooled. The other case, when $T_{21+sc} < T_{10}$, results in no cooling and the gas is heated in a time of the order of $T_{21+sc\ +T10}$.

Figure 2:
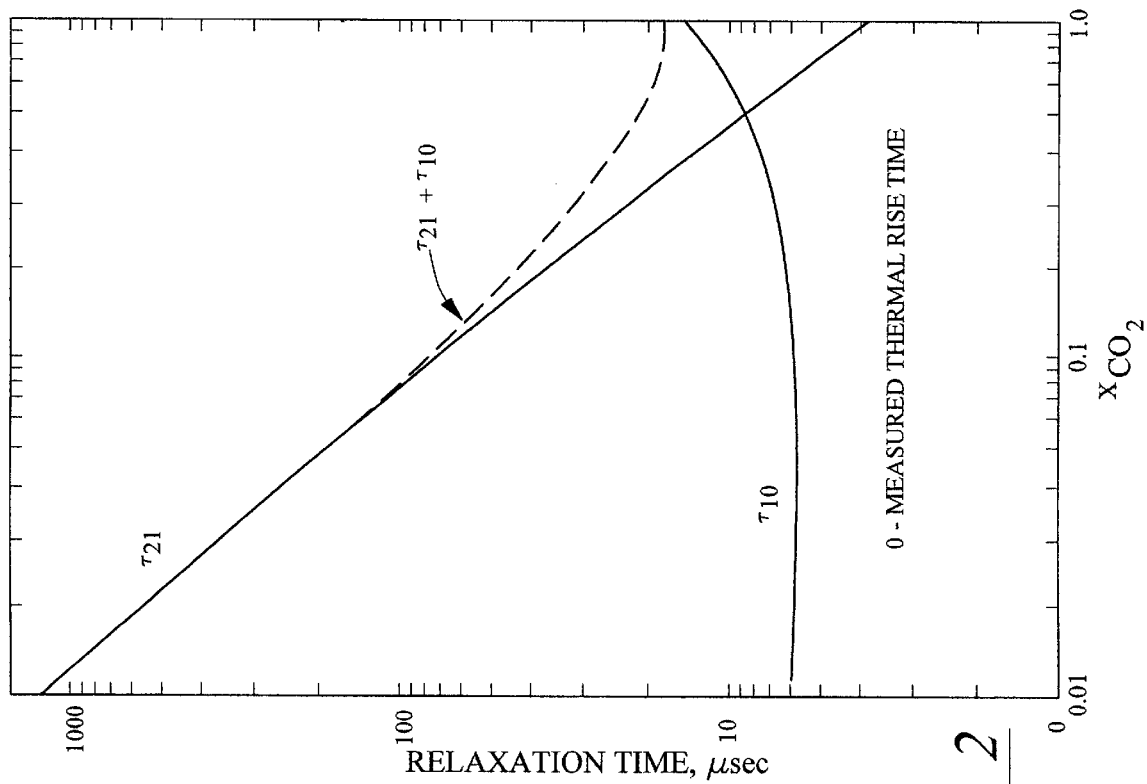
FIG. 2 is a plot of relaxation time of the lower $CO_2$ level, $T_{10}$, and the upper $CO_2$ level, $T_{21}$ and their sum, in carbon dioxide-nitrogen mixtures as a function of the partial pressure (X) of carbon dioxide.

The rates of a $CO_2$—$N_2$ mixture are shown in FIG. 2 as a function of the partial pressure X of $CO_2$ at one atmosphere (atm) total pressure. These lifetimes can be altered to suit the engine conditions, and the absorption of $CO_2$ can be changed by altering the temperature. At standard temperature and pressure (STP) conditions (1 atm and 300° K)

$$\alpha = 2 \times 10^{-3} x_c \text{Pcm}^{-1}$$

where $X_c$ is the partial pressure of $CO_2$ in atmospheres, P is the total pressure in atmospheres and $\alpha$=the absorption coefficient for $CO_2$. The lifetimes can be lengthened by lowering the total pressure.

Figure 3:
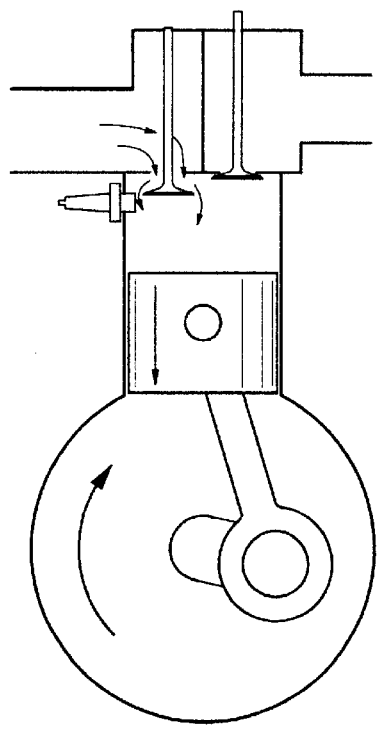
FIGS. 3A–3D are simplified, front elevation views of an internal combustion engine, illustrating a conventional four-stroke Otto cycle.
Figure 3:
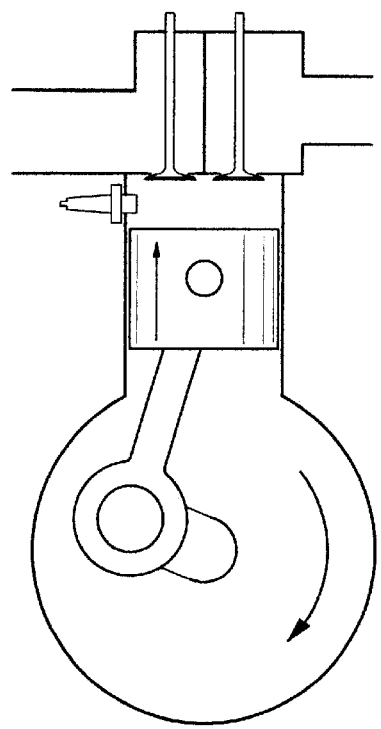
Figure 3:
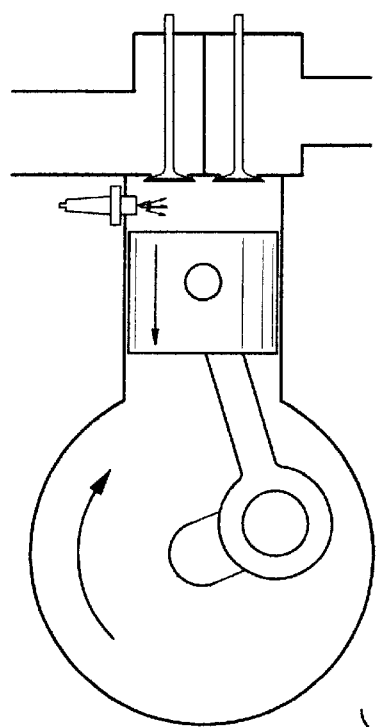
Figure 3:
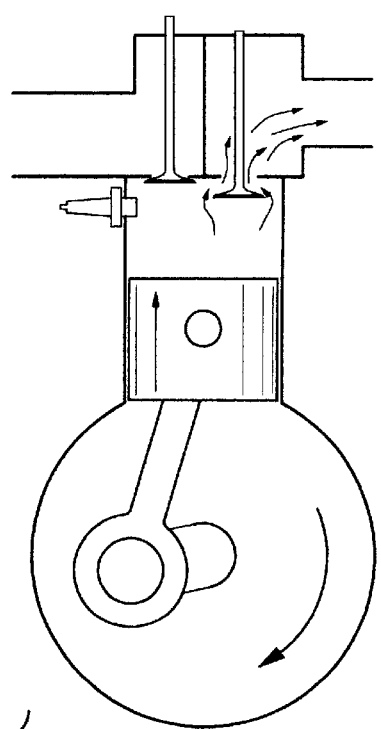
Figure 4:
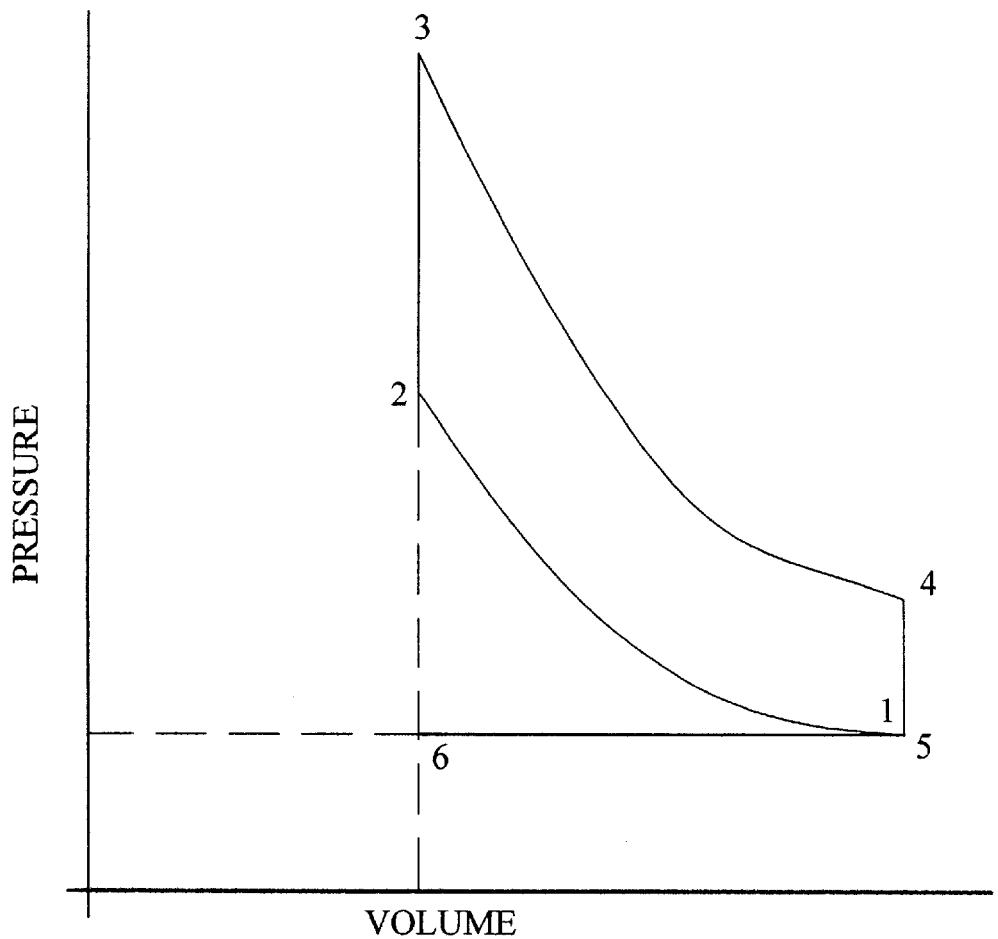
FIG. 4 is an idealized pressure-volume diagram of an Otto cycle engine.
Figure 5:
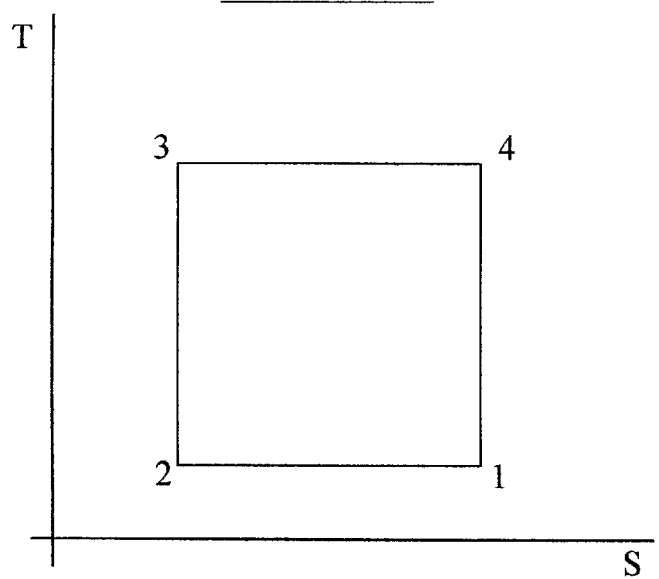
FIG. 5 is an idealized temperature (T) entropy (S) diagram for an Otto cycle engine.

According to the invention, the Otto cycle of an internal combustion (IC) engine is altered to make a kinetic cooling $CO_2$ laser engine. An Otto cycle engine undergoes four strokes as shown in FIG. 3: a) intake stroke, b) compression stroke, c) power or work stroke, and d) exhaust stroke. This corresponds to two revolutions of the crank shaft. The Otto cycle is represented on a pressure-volume plot shown in FIG. 4, and each point in the cycle is labeled. Step 1-2 is the compression stroke (b, FIG. 3) of the air-gasoline mixture. (This ideally is isentropic, which means it is completely reversible with no heat involved). Step 2-3 is the constant volume heat addition by combustion. Step 3-4 is the expansion of the combustion products and is the work stroke (c, FIG. 3). Step 4-5 is the release of the exhaust products or that part of the energy that is not used. In a practical engine, step 5-6 is the exhaust stroke (d, FIG. 3) and step 6-1 is the intake of a fresh charge of fuel-air mixture (a, FIG. 3). This is plotted on a temperature entropy diagram in FIG. 5. The efficiency of the engine depends on the energy available (thermal energy), $$dQ_A = \int T dS = T_a(S_4-S_3)$$

minus the heat ejected, $$dQ_R = T_2(S_1-S_2).$$

The efficiency of the engine is the energy available for work divided by the total energy, or $$\eta = \frac{Q_A - Q_R}{Q_A} = \frac{T_A - T_R}{T_A};$$

this is known as the Carnot efficiency (the highest efficiency achievable in a thermal internal combustion engine) and is completely determined by the maximum temperature in the engine and the minimum temperature of the exhaust. The laser engine of this invention is not restricted to this efficiency.

Figure 6:
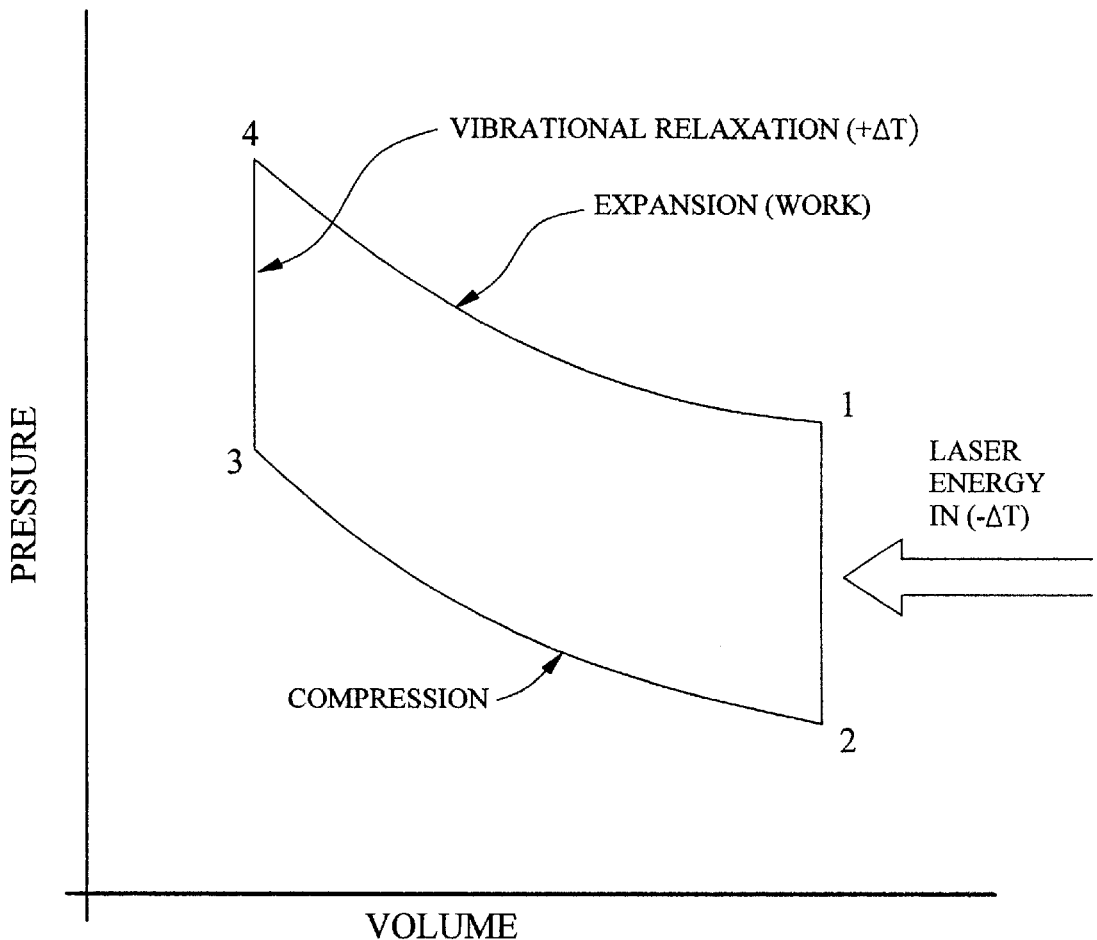
FIG. 6 is an idealized pressure volume diagram for an engine employing laser driven kinetic cooling.
Figure 7:
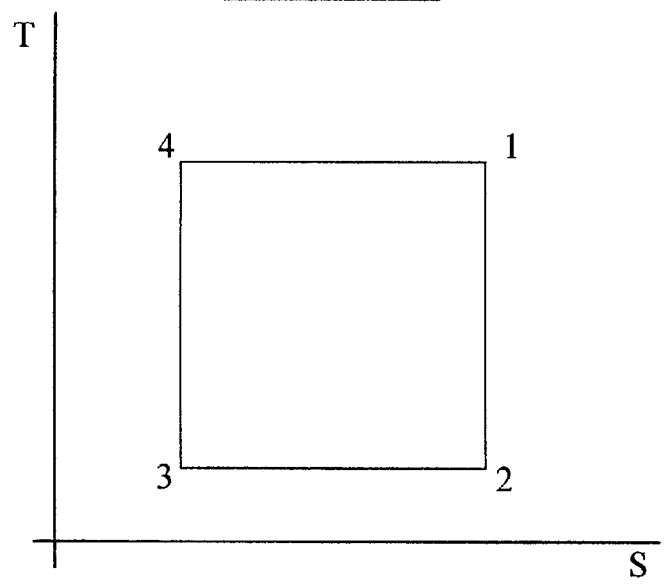
FIG. 7 is an idealized temperature-entropy diagram for an engine employing laser driven kinetic cooling.

FIG. 6 shows how the laser engine works. The piston is fully extended at 1, and $CO_2$ laser energy is absorbed by a mixture of $CO_2$—$N_2$ in the cylinder (a numerical example appears hereinafter). Because of the kinetic cooling, the temperature drops and, at constant volume, the pressure also drops, to point 2. Then adiabatic compression of the mixture raises the pressure to point 3. The time required to do this in the engine $t_{1-2}+t_{2-3}$ must be less than $T_{21+sc\ +T10}$. This is helped by the fact that the lowering of the pressure decreases the rate of collisional deactivation, thereby lengthening $T_{21+sc\ +T10}$. Now the compressed mixture of $CO_2$—$N_2$ vibrationally deactivates, converting vibrational energy into translational energy and raising the temperature and pressure to point 4. The time involved requires that $t_{3-4+sc} >> T_{21+sc} +T_{10}$; this is helped because the gas is at an elevated pressure that decreases the deactivation time. Now the gas adiabatically expands back to the original point, 1. The work is done in stroke 4-1. Unlike the Otto cycle, no waste products need be ejected. This is a completely closed system, is not really a thermal engine, and does not violate the laws of physics. The entropy production and the entropy reduction cancel for this engine.

The energy balance equation determines the temperature at a given time from time zero:

$$\rho c p \frac{\partial T}{\partial t} = \alpha I$$

where $\rho$ is the density, cp the specific heat, T the gas temperature, t is time, a the absorption coefficient and I the laser intensity. The solution is complicated by the time dependence but can be solved:

$$\Delta T = -\frac{1.44 \alpha l t}{\rho c p} + \frac{2.44 \alpha l t}{\rho c p}(1 - e^{-t/(T_{21}+T_{10})})$$

In order to increase the lower level population, the mixture of $CO_2$—$N_2$ is preheated to 1800° K, by heating the gas with the laser radiation, without the engine running, and in order to increase the kinetic cooling time, initial pressure is lowered to 0.05 atmospheres with a partial pressure of $CO_2$ of 2.5%.

The absorption coefficient for $CO_2$ under these conditions is $$\alpha = 10^{-3} \text{ cm}^{-1}.$$

This engine will be operated with a laser pulse which is short relative to any of the kinetic times. Therefore, the energy fluence is absorbed by the mixture with small signal absorption (not affecting number density of molecules) and will correspond to the saturation fluence. The energy absorbed per unit volume is $$\alpha_o E_s = (n_{100}/2)(h\nu)_c$$

where $E_s$ is the saturation fluence in joules/cm$^2$; $n_{100}$ is the population of the 100 vibrational level given by the thermodynamic equilibrium equation $$n_{100} = n_0 e^{-E_{100}/kT}$$

with $E_{100}$ the energy of the 100 above-ground state; k=the Boltzman constant; and (hv) is the energy of the $CO_2$ laser photon, $$(h\nu)_c = 1.8(10)^{-20}$$

At 1800° K and 0.05 atms. total, the number density of the lower absorption level is $$n_{100} = 1.6(10)^{17} \text{ cm}^{-3},$$

the small signal absorption is $$\alpha = 1 \times 10^{-3},$$

and the saturation fluence is $$E_s = 6.9 \text{ j/cm}^2.$$

From FIG. 2, scaled up from 1 atmosphere to 0.05 atmospheres, $$T_{21} = 1 \times 10^{-2} \text{ sec.}$$

$$T_{10} = 1.2 \times 10^{-4} \text{ sec.}$$

Figure 8:
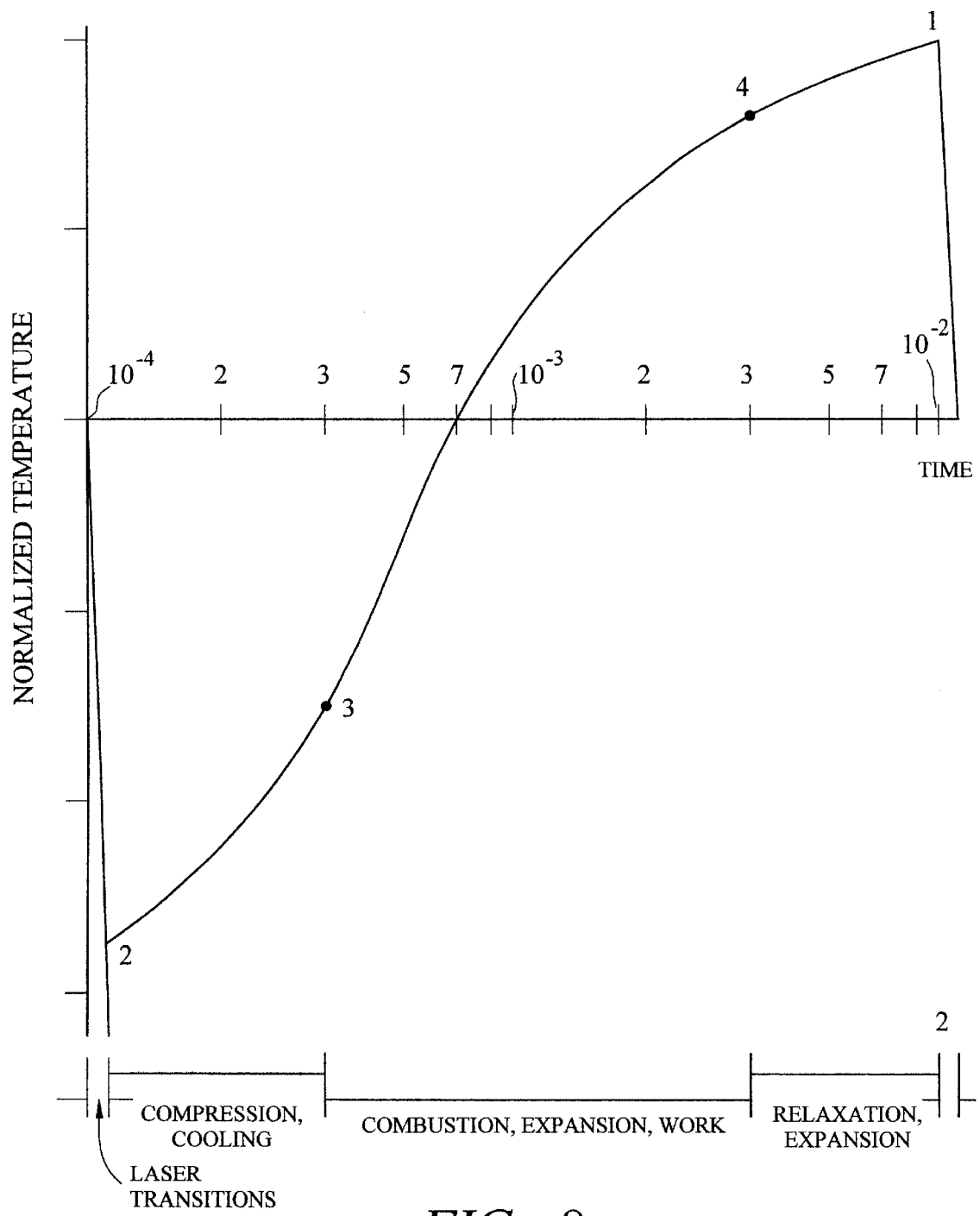
FIG. 8 is a plot of temperature as a function of time illustrating the temperature history of a carbon dioxide-nitrogen gas mixture adiabatically cooled by a pulse of laser radiation, if it is performing no work.

Plotted in FIG. 8 is the time history of the temperature in the absence of any cycle, i.e., what the temperature history would be if the gas mixture was left alone (did no work) when irradiated with a laser pulse. This plot is useful in determining the times for compression, combustion and expansion. In FIG. 8, the suggested compression cycle (2-3) is shown with a total time of $3(10)^{-4}$ seconds. The combustion cycle (3-4) extends from a time of $3(10)^{-4}$ seconds to $3(10)^{-3}$ seconds, and the expansion or work cycle (4-1) goes from $3(10)^{-3}$ to $10^{-2}$ seconds. In a real engine these times are controlled by using a cam mechanism attached to the rod connected to the piston. This is analogous to the cam used in an IC engine to control the opening and closing of the input and exhaust valves. Also shown at the bottom of FIG. 8 are these times which would correspond to the cam cycles. For example, the time for absorption of laser radiation is extremely short and arbitrary, but may be $7 \times 10^{-6}$ seconds, the compression cycle is $3 \times 10^{-4}$ seconds; the combustion cycle is about $3 \times 10^{-3}$ seconds, and the expansion cycle is about $7 \times 10^{-3}$ seconds.

Based on the steps or stroke times in FIG. 8, the period of the complete engine cycle is about:

$$t_p = 1.1 \times 10^{-3} \text{ sec,}$$

so the repetition rate is about

REP=100 RPS, or more commonly given as

REP=6,000 RPM.

The energy absorbed per unit volume is $$\alpha_o E_s = 6.9 \times 10^{-3} \text{ j/cm}^3$$

which based on the RPS corresponds to an average power over a cycle of

Power=0.14 watts/cm$^3$

Consider an engine with a piston of 11.0 cm diameter and a length of 10 cm, corresponding to a volume of 1000 cm$^3$, or one liter:

Power=$10^3 \times 0.14 = 140$ watts=0.18/HP

The small engine of the example is powered by a $CO_2$ laser with an energy per pulse of 1.4 joules, a REP rate of 100 pulses per second and a pulse duration of less than $10^{-3}$ seconds. Based on the kinetics of $CO_2$ lasers, these values are readily achievable, and the operating pressure and gas mixture in the laser are adjustable to make the $CO_2$ laser as efficient as possible.

The thermodynamic properties at each point can be calculated. The decrease in temperature from point 1 to point 2 is $$\Delta T = \frac{\alpha_o I_s t}{\rho c_p}(1.44° \text{ K.}) = -243° \text{ K.}$$

so $$T_2 = 1800° \text{ K} - 243° \text{ K} = 1557° \text{ K}$$

and the pressure is $$P_2 = P_1(T_2/T_1) = 0.043 \text{ ATM.}$$

The adiabatic compression back to 0.05 atm gives the ratio of the volumes at points 1 and 3:

$$P_2 V_2^\gamma = P_3 V_3^\gamma$$

where y is the specific heat ratio (cp/cv), and the compression ratio is given by $$V_2/V_3 = (P_3/P_2)^{1/\gamma} = (0.05/0.043)^{0.71} = 1.1.$$

Figure 9A:
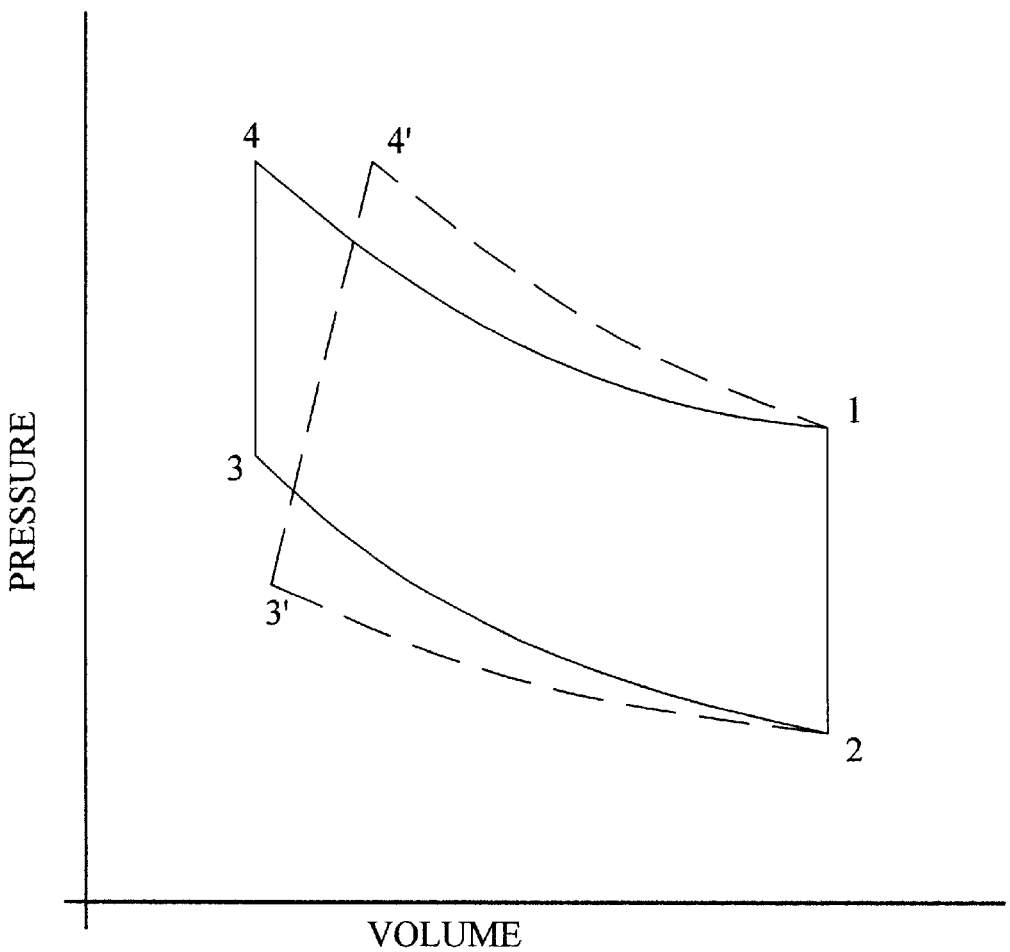
FIG. 9A is a combined idealistic and realistic pressure volume diagram for an engine employing laser driven kinetic cooling.
Figure 9B:
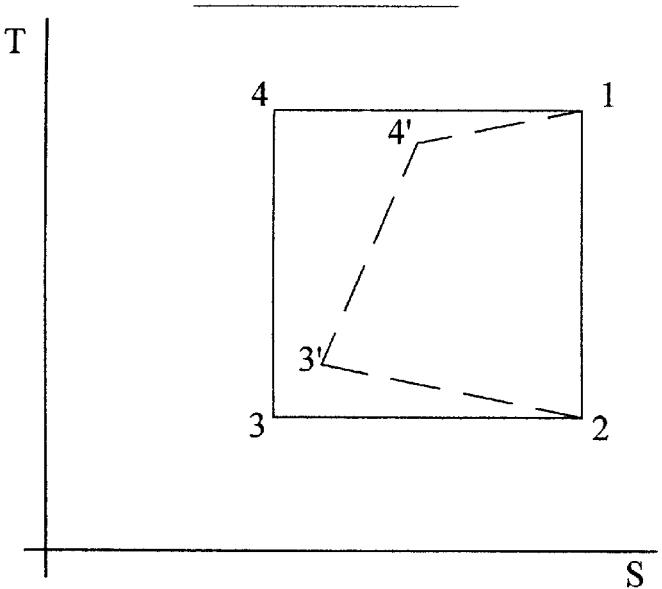
FIG. 9B is a combined idealistic and realistic temperature-entropy diagram for an engine employing laser driven kinetic cooling.

Because of the finite times involved in the relaxation, the ideal Otto cycle is not achievable, and less than 100% of absorbed laser energy is converted into mechanical work in real engines. This is reflected on the P-V and T-S diagrams shown in FIGS. 9A and 9B. The initial condition, 1, and the cooling point 2 can be substantially achieved, subject to the impact of the acoustic transit time, to convert the thermal input energy into density and corresponding pressure changes. It is possible to design a better engine for different operating conditions. The numerical example has a slightly high RPM for a reciprocating engine.

The reciprocating laser engine described hereinbefore is small, but is only given as an example and larger engines can be designed. The stroke of the engine is also small (only 1 cm for a 10 cm long cylinder) which works to advantage in the design of a smoothly operating cam 7 illustrated in FIGS. 10 and 11.

Figure 10:
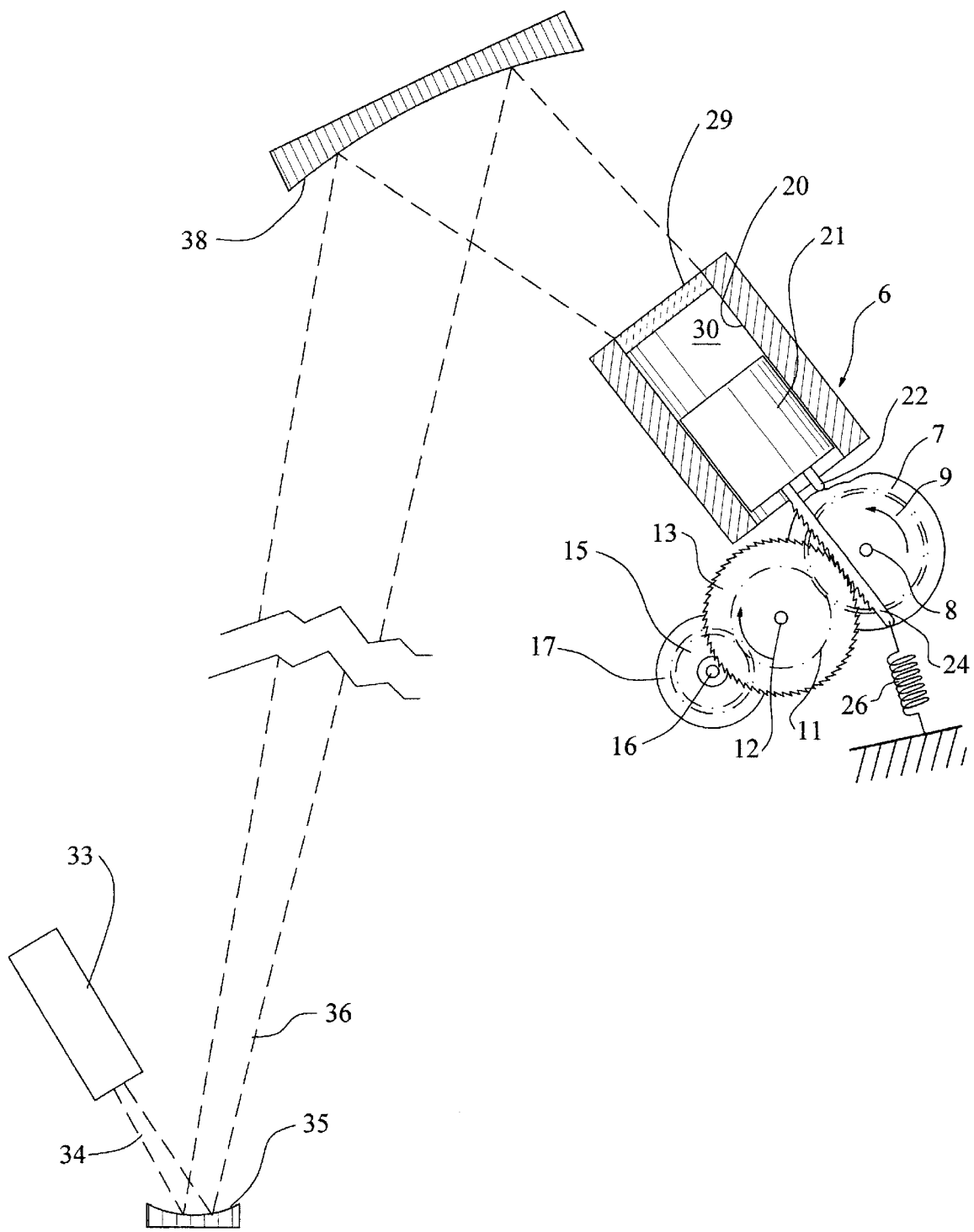
FIG. 10 is a stylized, schematic diagram of a reciprocating engine employing laser driven kinetic cooling according to the invention.

Referring to FIG. 10, an exemplary system including a laser engine 6 is schematically illustrated. The cam 7 is journaled to rotate continuously about a shaft 8 by a gear 9 to which it is affixed. The gear 9 is in turn driven by a gear 11 which is journaled on another shaft 12 along with a ratchet driving gear 13. The gear 11 can also be driven by a gear 15 which is connected through a clutch 16 to a starter motor 17, in a conventional fashion. The engine itself comprises a cylinder 20 containing a piston 21 which has a cam follower 22 affixed thereto so as to cause the piston 21 to assume a position determined by the cam 7. A ratchet 24 is also fixed to the piston 21, and a spring 26 urges the ratchet 24 and therefore the piston 21 and the cam follower 22 in an outward direction, thus causing the cam follower 22 to rest on the cam 7 at all times. In FIG. 10, the piston 21 is midway through the power stroke, between points 4 and 1 in the foregoing description. The teeth on the ratchet 24 will engage teeth on the gear 13 during the power stroke, but the gear 13 can continue to move, with its teeth sliding past the teeth on the ratchet 24 due to the resilience of the spring 26. The gear 13, or something attached to it through the shaft 12, must be formed as a flywheel so as to have continuous motion, in response to being stroked periodically by the ratchet 24. The cylinder 20 is closed off by a window 29 so as to confine the $CO_2$—$N_2$ gas mixture within the space 30. Work is performed on a device connected to the shaft 12.

The $CO_2$ laser 33 directs radiation 34 to a first mirror 35 which in turn directs radiation 36 to a second mirror 38. The laser 33 and mirror 35 are located at an accessible point, where there is fuel or other energy to operate the laser 33. The mirror 38 and laser engine 6 are disposed in a remote location, where energy, fuel, and consumable gases are difficult to provide, such as in the air, in space, at sea, on mountains or in marshes or jungles.

Figure 11:
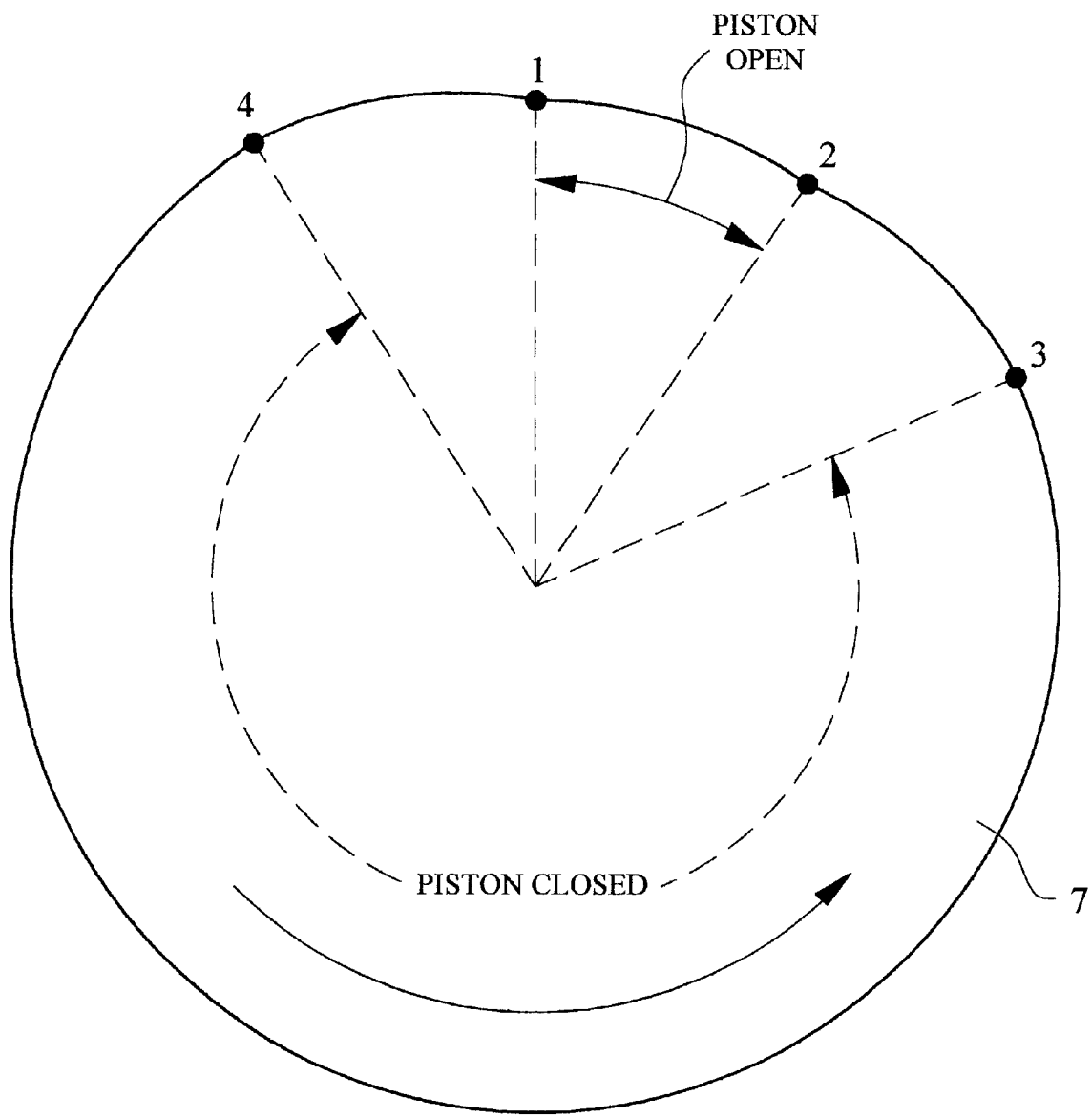
FIG. 11 is a diagram illustrating the shape of a cam to control the timing of the piston movement in FIG. 10.

The detail of the cam 7 is illustrated more clearly in FIG. 11. In the example hereinbefore, having a one centimeter stroke, the radius of the cam in the region between point 1 and point 2 will be one centimeter less than the radius of the cam between points 3 and 4. Otherwise, so long as relatively smooth transition can be provided between points 4 and 1 and between points 2 and 3, the size of the cam is immaterial.

The apparatus illustrated in FIG. 10 comprises a single cylinder, which is cooled by a pulsed $CO_2$ laser. However, a plurality of cylinders could be arranged side-by-side, their cams 7 and gears 13 being intermeshed with one another, each cam 7 floating freely on the axle 8, but the gears 13 all fixed to the axle 12. The timing may be distributed so that there is a continuous supply of power from one system or another. In such a case, a continuous wave laser may be utilized in place of a pulsed laser, and a mirror stepped between various positions so as to alternatively direct the laser radiation to the one of the cylinders which has its piston opened (between points 1 and 2 on the cam). The power which could be achieved with multiple cylinders is a corresponding multiple of the power which could be achieved with one cylinder. Use of a CW laser with multiple cylinders also permits synchronizing the application of the laser power to a cylinder locally, that is, at the site of the cylinder, rather than synchronizing a laser pulse which is a great distance from the cylinder. Synchronization of a pulsed laser to a remote cylinder may be achieved with radio waves responding to an indicia synchronized with the cam 7.

The Otto cycle by its very nature is pulsed, and requires a pulsed laser as a source to drive it. It also has a very low saturation energy fluence because the energy per unit volume is limited by the number of $CO_2$ molecules in the lower level of the absorption transition (the 100 level). These limitations can be overcome by use of a turbine engine, which provides additional advantages as well.

Figure 12:
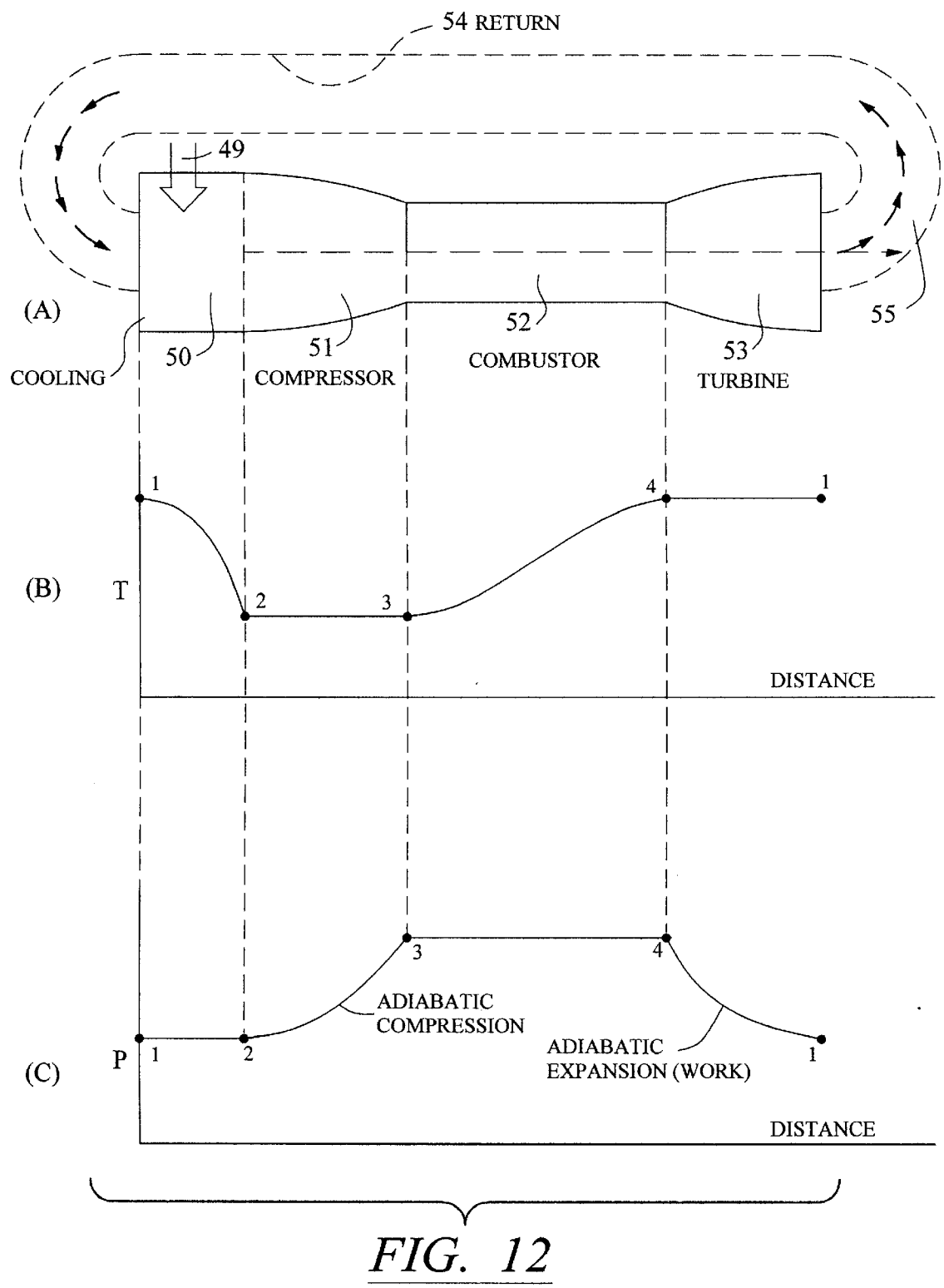
FIG. 12 is an illustration of a turbine in accordance with the invention together with temperature and pressure on a common distance base.

Referring to FIG. 12A, a turbocompressor is made up of four main parts: the cooling segment 50 where the laser energy 49 is absorbed, the compressor 51, the combustor 52 or heat release segment, in which the relaxation of the vibrational energy levels takes place, and the turbine or work segment 53. A gas return flow path 54 is required to close the cycle. As described more fully hereinafter, the compressor and turbine segments 51, 53, as well as the mechanical output of the device, are all on the same shaft or axle 55. Work is performed on some apparatus connected to shaft or axle 55. In FIG. 12B, the desired temperature as a function of the stages of the engine is shown. A mixture of $CO_2$ and $N_2$ is rapidly flowing through the various segments of the engine. In passing through the cooling segment 50, the gas is irradiated with a continuous wave $CO_2$ laser and is cooled by converting translational (heat) energy into vibrational energy as described hereinbefore. This occurs between points 1 and 2 in FIG. 12B. The turbocompressor conforms to the conventional Brayton cycle so the cooling phase is at constant pressure as is shown in FIG. 12C. The gas mixture is then compressed adiabatically in the compressor segment 51 from point 2 to a higher pressure at point 3 in FIG. 12C. The time required for the cooling plus the compression must be short compared to the deactivation time, $T_{21}$. In the combustor section 52, the release of vibrationally excited energy stored in the 001 level of $CO_2$ and the v=1 level of $N_2$, which occurs at constant pressure between points 3 and 4 (FIG. 12C), raises the temperature of the gas mixture (FIG. 12B). The time required for the relaxation process must be comparable to the sum of the upper level lifetimes, $T_{21}$, plus the lower laser level lifetime, $T_{10}$ (FIG. 2). The final stage of the process is the adiabatic expansion (FIG. 12B) through the turbine 53 where work is done and the pressure is, by expansion, reduced back to the original pressure at point 1 (FIG. 12C). The gas is then passed through the return 54 to the cooling segment 50 to reenter the cooling cycle and repeat the process. This is not a stepwise process of a single volume of gas, but rather a continuous process to a flow of gas mixture, and therefore represents a continuous device. Similarly, the laser which provides the cooling can be a continuous wave laser. Because the compressor segment 51 and the turbine segment 53 require about the same time for operation and therefore the same rotational speed, they may be attached to the same shaft or axle 55. The rotation of the axle 55 is controlled externally, and the power is extracted from the rotating axle, as is described more fully hereinafter.

Figure 13:
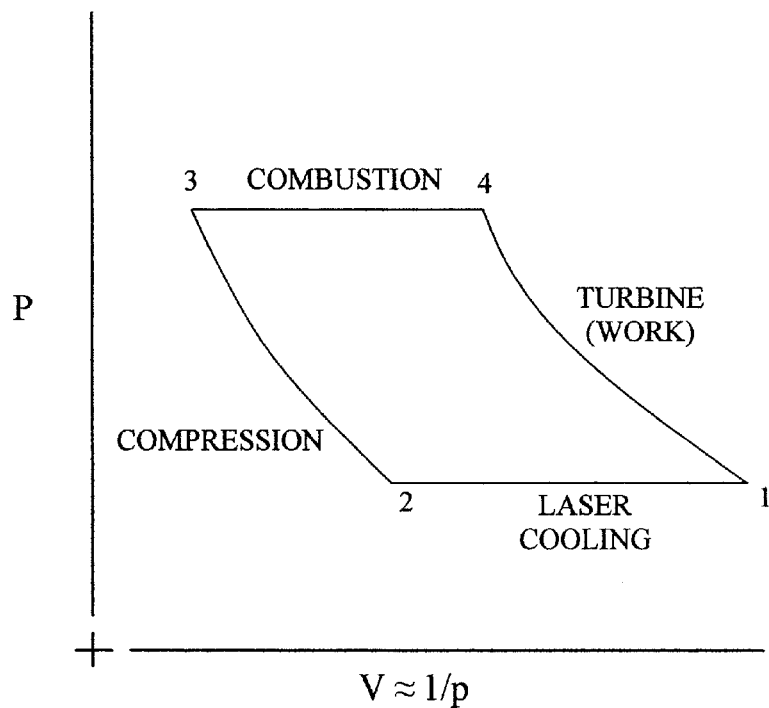
FIG. 13 is a pressure-volume diagram of a Brayton cycle.
Figure 14:
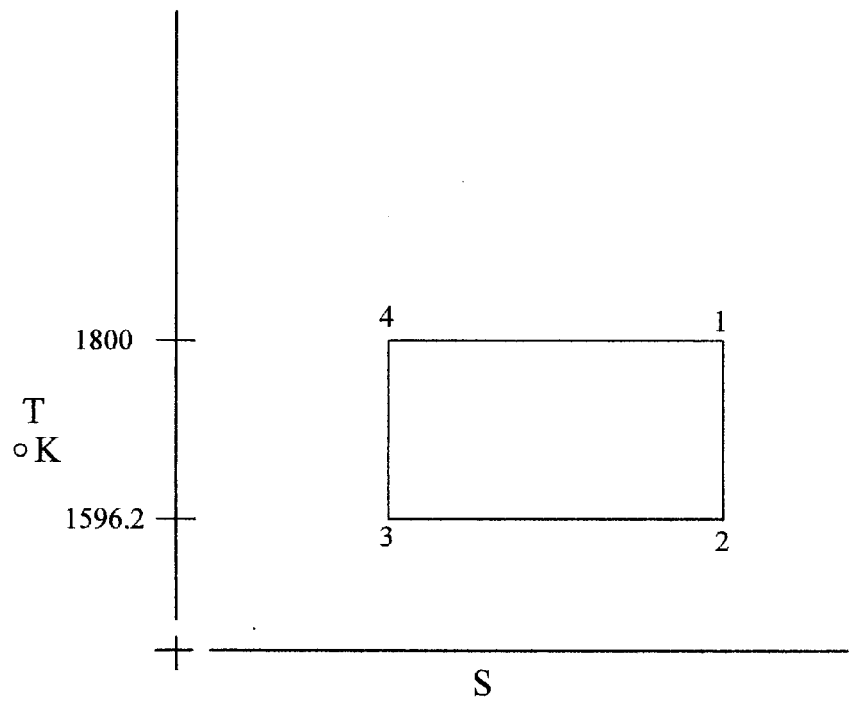
FIG. 14 is a temperature-entropy diagram of a Brayton cycle.

The Brayton cycle is represented in the pressure/volume diagram of FIG. 13. Between points 1 and 2, the laser radiates the $CO_2/N_2$ mixture thereby cooling it. Between points 2 and 3, the gas is compressed adiabatically in the compressor segment 51. Then between points 3 and 4, within the combustor 52, the vibrational energy is converted into translational energy, raising the temperature at constant pressure. The cycle is completed between points 4 and 1 in the turbine segment 53 where the gas expands adiabatically, doing work. In FIG. 14, the exemplary T/S (temperature/entropy) diagram is self-explanatory. The conversion of laser energy to work in the turbocompressor is essentially 100% efficient, and no fuel or gas is expended on the site of the engine.

Figure 15:
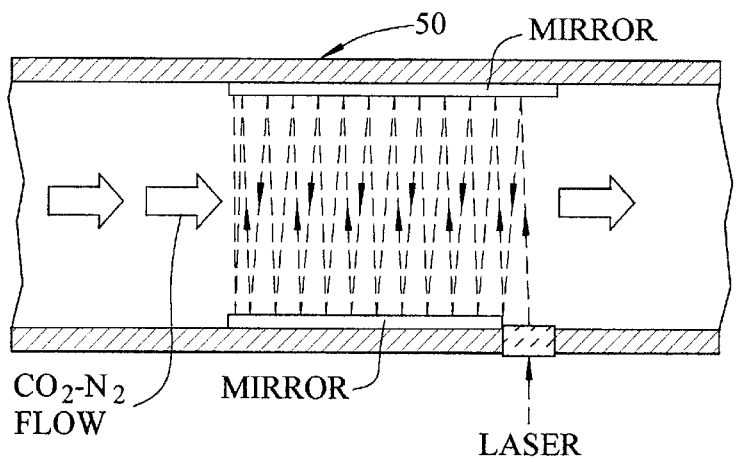
FIG. 15 is a side elevation view of gas flow through a multi-pass mirror configuration.

The laser input portion of the process just described corresponds to the heat rejection cycle of the Brayton engine, in a real world, fuel-burning turbine. The absorption of laser power, which results in a temperature drop, is in fact adding the energy to the engine to be released in the combustion segment where the vibrationally stored energy is converted to translational, thermal energy. In order to achieve sufficient absorption of laser vibrational energy with relatively low laser absorption per unit length, a multiple-pass cooling segment 50 may be utilized, as illustrated schematically in FIG. 15. The absorbed laser power is continuously transmitted through the engine by convection in the stream of gas having velocity, V, according to the following equation:

$$\rho c_p V(\delta \Delta T/\delta X) = \alpha |$$

where $\alpha$ is the absorption coefficient per unit length of $CO_2$, | is the laser intensity, $\rho$ is the density, cp is the specific heat and $\Delta T$ is the temperature change of the gas mixture, X is the gas flow distance within the irradiation—from the entrance of the cooling segment to its exit, reflecting both the translational energy (which is truly temperature) and the stored vibrational energy in the upper absorption level of $CO_2$ and the v=1 level of nitrogen. Expressed in terms of the true temperature of the gas, this becomes $$\Delta T = (-1.44\alpha_o|X)/(\rho c_p V) + (2.44\alpha_o|X)/(\rho c_p V)(1-e^{-(x/v)/(T_{21}+T_{10})})$$

where X/V represents the dwell time of the gas within the laser radiation. In order for the gas mixture molecules to become sufficiently vibrationally excited and remain in the upper, vibrational energy levels until completion of compression, the time required for excitation of molecules from the lower translational levels to the higher vibrational levels has to be much less than the relaxation time from the upper vibrational levels to the lower translational levels:

$$t_{1-2} + t_{2-3+sc} << T_{21}$$

so $$(X_{1-2}/V) + (X_{2-3}/V) << T_{21}$$

where 1-2 is the cooling segment (FIG. 12A) and 2-3 is the compression segment. A critical feature of the invention is absorption of the laser power and storing the absorbed power as vibrational energy to be released, equivalent to combustion, in a subsequent portion of the Brayton cycle. The absorption of the laser energy into the $CO_2/N_2$ mixture is, by its very nature, small; for one atmosphere at 300° K conditions, the absorption coefficient is:

$$\alpha = 2(10)^{-3} {}_X P f(T) \text{ cm}^{-1}$$

where X is the mole fraction of $CO_2$, P is the total pressure in atmospheres, and f(T) is the increase in $CO_2$ lower level absorbing atoms due to elevation of the temperature above ambient (300° K).

$n_{100} = 7.25(10)^{16} \text{cm}^{-3}$ at standard temperature and pressure $n_{100} = 7.25(10)^{16} e^{T/300} \text{cm}^{-3}$ at temperature, T.

For a flowing system, the saturation intensity is given by $$I_s = h\nu/\sigma t_R$$

where $t_R$, in this case, is the replacement rate ($T_{10}$) of the laser absorption level.

In order to utilize all of the incident laser power, saturation must be avoided. This means that the intensity must be kept less than the saturation intensity, $I_s$, and this in turn requires that there is a sufficiently long absorption path so that all of the laser intensity is absorbed. The intensity, I, at any distance, $L_A$, along the absorption path decreases as follows:

$$I = I_0 e^{-\alpha L_A}$$

where $\alpha$=absorption coefficient. The ratio $I/I_0 = e^{-\alpha L_A}$ must be much less than one, where $L_A$=the absorption length (not flow-through time) in the cooling segment 50. From a practical standpoint, $\alpha$ can be of the order of $(10)^{-3}$ cm$^{-1}$, requiring that $L_A$ be much greater than $(10)^3$ cm in order to absorb most of the incident laser power.

Figure 16:
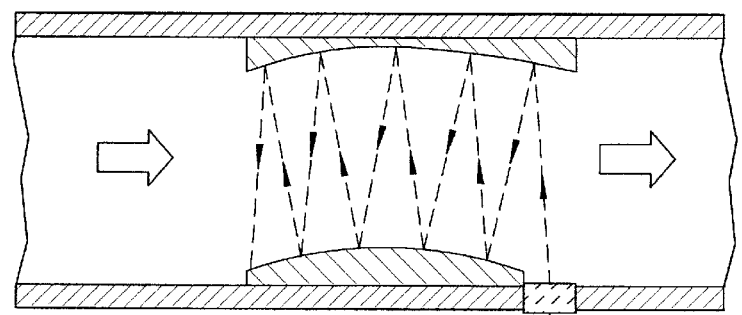
FIG. 16 is a sectioned, side elevation view of a White cell.
Figure 17:
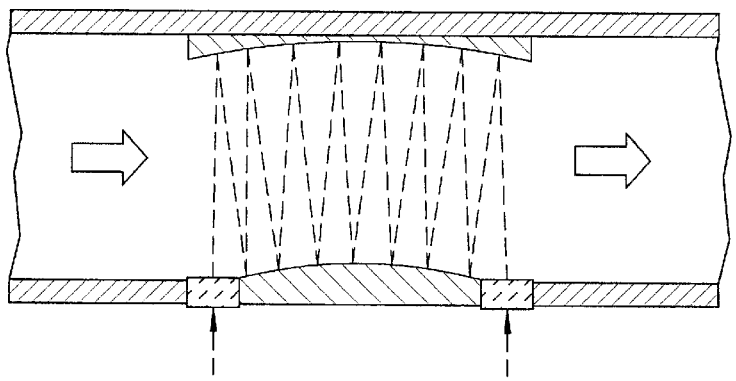
FIG. 17 is a sectioned, side elevation view of an unstable resonator.

To provide maximal absorption of laser energy into the $CO_2/N_2$ mixture with a minimum of physical size, a White cell, illustrated in FIG. 16 may be used. The White cell has a slightly concave mirror facing a slightly convex mirror so as to force the light path to essentially fill the volume; within the size of a system being considered in this example of the invention, the light will be reflected hundreds or thousands of times (the few reflections shown in FIG. 16 are in fact misdescriptive, but necessitated for clarity). Thus a White cell can provide an absorption path having a length that is hundreds or thousands times larger than the dimension between the mirrors. Another device which can provide the same effect is an unstable resonator, as shown in FIG. 17. The saturation fluence for the $CO_2/N_2$ mixture is extremely high, so that large amounts of laser energy can be pumped into the system before the absorption capability becomes saturated. Therefore, a significant fraction of the incident laser power can be absorbed into the gas mixture, even with a small absorption coefficient, $\alpha$.

In order to recover all of the laser energy as heat within the combustion sector 52, between points 3 and 4 of the Brayton cycle, the time must be greater than the time required for the vibrationally excited molecules to relax to the ground state, thus $$t_{3-4} = X_{3-4}/V >> T_{21+sc} + T_{10}$$

Meeting this requirement allows the vibrational energy to be released and conditions the gas mixture for the expansion to take place within the turbine sector 53. Since the turbine sector 53 and the compressor sector 51 are disposed on the same shaft or axle, the dwell time for flow through them will be approximately the same $$t_{4-1} = X_{4-1}/V \approx t_{2-3}$$

The foregoing time relationships establish the time and flow rate constraints for the closed cycle system.

As an example, consider a one megawatt continuous wave $CO_2$ laser as a power source. The absorption coefficient for the $CO_2$ gas molecules (also set forth hereinbefore) is $$\alpha = 2(10)^{-3} {}_X Pf(T) \text{ cm}^{-1} \text{ and}$$

$$f(T) = (e^{T/300°})(300°/T)$$

This expresses the increase in 100 vibrational level equilibrium due to thermal equilibrium $$n_{100} = n_0 e^{-E_{100}/kT}$$

where $n_{100}$ is the population of $CO_2$ molecules excited to the 100 vibrational energy level, $n_0$ is the total population of $CO_2$ molecules, $E_{100}$ is the energy of the 100 level above ground state, and $k$ is the Boltzman constant; this yields $$n_{100}(T)/n_{100}(300°) = e^{T/300°}(300/T)$$

The factor $300°/T$ is the reduction in total $CO_2$ population caused by the increase in temperature at a fixed pressure. In this example:

$$X_{CO_2} = 0.01$$

P=one atmosphere
T=1800° K which yields:

$$\alpha = 2(10)^{-3}(0.01)(1)e^6(300/1800) = 1.3(10)^{-3} \text{ cm}^{-1}$$

The effective length required to absorb 86% of the incident laser energy is $$L_{eff} = 1487 \text{ cm}$$

which equates to 25 double passes in a 30 centimeter wide cooling segment, using either a White cell or an unstable resonator, as described with respect to FIGS. 16 and 17 hereinbefore.

Figure 18:
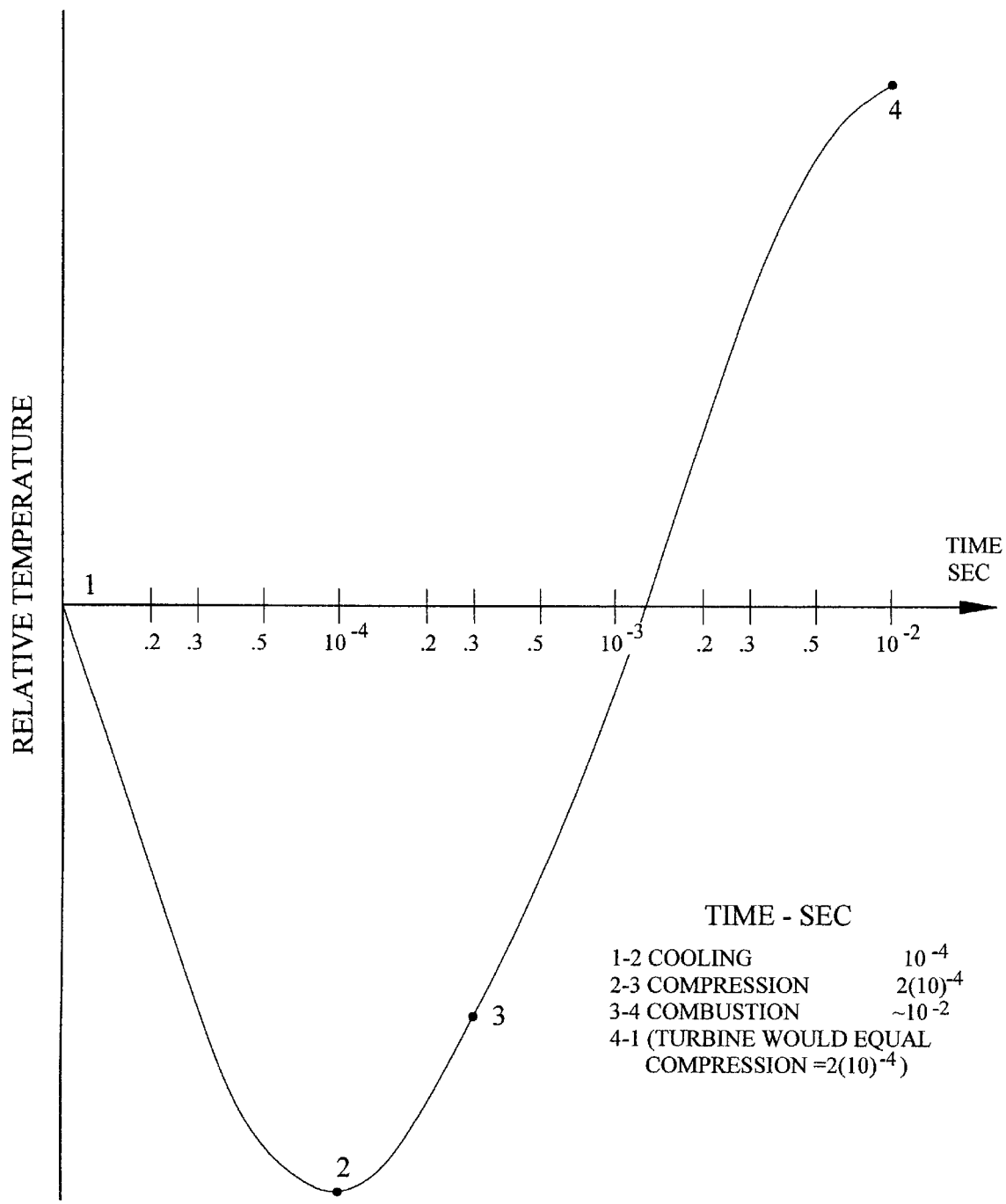
FIG. 18 is a plot of relative temperature as a function of transit time in kinetically cooled $CO_2$—$N_2$ mixture which is not compressed or expanded.
Figure 19:
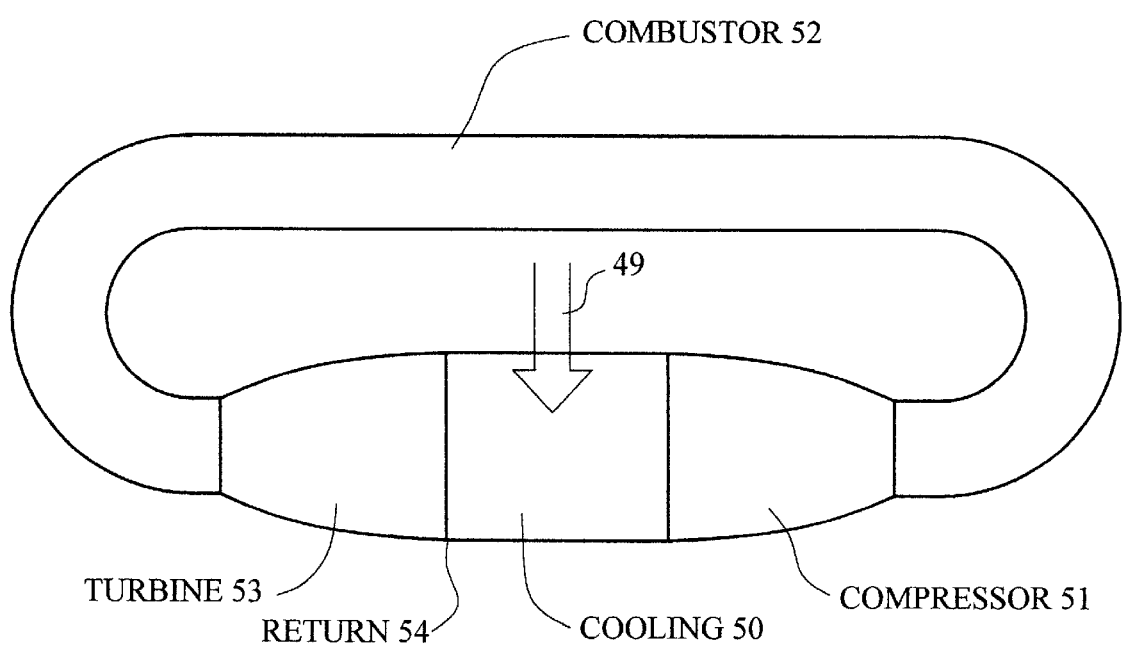
FIG. 19 is an alternative configuration for a kinetically cooled, laser powered gas turbine in accordance with the present invention.

A plot of the temperature of a static mixture of $CO_2$ and $N_2$ (not flowing) as a function of time is shown in FIG. 18. As seen in FIG. 18, the time for cooling may be approximately $10^{-4}$ seconds; the time for compression in the compression segment 51 will be approximately $2(10)^{-4}$ seconds; the time for relaxation within the combustor segment 52 is essentially $10^{-2}$ seconds; and the time for doing work in the turbine sector 53 is the same as that in the compressor sector 51, $2(10)^{-4}$ seconds. In the cooling cycle, the maximum amount of cooling that may be lost is $$1 - e^{-10^{-4}/T_2 1} = 0.6$$

which may be ignored. Given a velocity of $6(10)^4$ cm/sec, the total path length through the compressor should be $$6(10)^4 \times 2(10)^{-4} = 12 \text{ cm};$$

this is somewhat short, but a compressor length on the order of 30 cm can be utilized by sacrificing a small amount of efficiency. The combustor length requires a dwell time of $10^{-2}$ seconds. If, for example, the overall length of the combustor sector 52 is 60 cm, the velocity in the combustor will be $$6(10)^3 \text{ cm/sec,}$$

and a corresponding cross sectional area would be 10 times larger than the cross sectional area of the compressor. However, the time within the combustor section can be extended as necessary so as to cause the cross section of flow to be the same at the output of the compressor, in the combustor, and in at the input to the turbine, as is illustrated in FIG. 19. The constraint on the length of combustor in FIG. 19 is simply that the gas be allowed to substantially completely relax so that close to 100% of the energy is in the translational energy levels (heat), rather than the vibrational levels.

The exemplary laser driven, kinetic cooling turbocompressor would have initial conditions at point 1:

P=one atmosphere
$X_{CO_2} = 0.01$
$X_{N_2} = 0.99$
T=1800° K
$V = 6(10)^4$ cm/sec (Mach number=0.3)
Power=$10^6$ watts at point 2 of the Brayton cycle, the conditions are:

$T_2 = 1.596.2°$ K
$P_2$=one atmosphere
$\rho_2 = 1.88(10)^{-4}$ gms/cm$^3$

Between point 2 and point 3, the gas mixture is adiabatically compressed, the temperature being maintained at $T_2$.

$$P_2 V_2^y = P_3 V_3^y$$

where y is the specific heat ratio, cp/cv.
Thus, $P_3 = 1.18$ atmospheres,
$T_3 = T_2 = 1596.2°$ K
and $\rho_3 = 2.310^{-4}$ gms/cm$^3$.

It follows that:
$P_4 = P_3 = 1.18$ atmospheres
$T_4 = T_1 = 1800°$ K

The power generated by the engine of this example is one megawatt of mechanical power, less the frictional losses and losses due to non-adiabatic conditions which can be made small. Thus, a one megawatt continuous wave $CO_2$ laser is capable of providing, remotely, an engine with the following horsepower:

$$10^6 \text{ Watts}/(770 \text{ Watts/H.P.}) = 1298 \text{ H.P.}$$

because it is continuously receiving and absorbing continuous wave laser power, and continuously converting that power into mechanical work.

The preferred form of the invention is the turbocompressor. The turbocompressor can be configured as shown in FIG. 19 so as to be more compact than the turbocompressor of FIG. 12(A), but more importantly, to allow the length of the combustor to be much greater than the length of the mechanical components, whereby complete relaxation of the vibrational levels, and therefore maximal heating may be achieved. The only limit on the length of the combustor is that there be no needless waste of heat through radiative cooling: in other words, the combustor should be just long enough to ensure that all of the vibrational energy has relaxed to translational energy.

The obvious applications for a laser driven, kinetic cooling engine of the invention include any situation where transport of the fuel (or other energy) to drive the engine is expensive. A clear cut application is a satellite-based engine, utilizing a ground-based laser to power the engine through kinetic cooling. Other applications include situations where the deliverance of fossil fuel would be extremely expensive in comparison with the value of the results to be achieved. Thus, an application of a relatively short duration, such as a few months, might not justify laying pipelines to deliver fuel some distance to a remote site; some terrain might have geological or ecological conditions causing the unit cost of delivering fuel to be prohibitively exorbitant.

A particularly useful application of the invention is providing the power to vehicles, for propulsion and other purposes. The vehicles may include land vehicles, aircraft, including airplanes, helicopters, and lighter-than-aircraft, as well as space vehicles, space stations, and ocean-going vessels of all types. The one or more pistons of a reciprocating embodiment of the invention, or the shaft of a turbocompressor embodiment of the invention, may drive wheels or tracks of land vehicles, propellers or fans of airplanes, rotors of helicopters, pressure pumps for steering jets of spacecraft, screw propellers or flow-through turbines for ships and boats. The invention also may be utilized to generate electric power, in the foregoing and a wide variety of other applications.

The foregoing exemplary parameters are by way of illustration, and the invention may take a wide variety of forms at different temperatures, pressures, volumes, flow rates, and the like.

Instead of a $CO_2/N_2$ laser, the kinetically cooled engines of the invention may be irradiated by quantum cascade laser diodes, such as gallium nitride (GaN) laser diodes, or any other competent laser.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. An engine system comprising:
   an engine connected to a mechanical work output device for confining a volume of a gas having at least one upper, vibrational energy level, at least one lower vibrational energy level and ground state translational energy, for compressing said gas substantially adiabatically, and for expanding said mixture substantially adiabatically while performing work;
   irradiation means for irradiating said gas, before said gas is compressed, to excite at least a portion of the molecular population of said gas to said at least one upper, vibrational energy level, thereby reducing the translational energy in said gas and cooling at least a portion of said gas; and
   said engine allowing said gas to relax between when said gas is compressed and when said gas is expanded, said vibrational energy returning to translational energy, thereby warming at least a portion of said gas.

2. A system according to claim 1 wherein said gas is a mixture of carbon dioxide and nitrogen.

3. A system according to claim 2 wherein the mole fraction of carbon dioxide is about 1%.

4. A system according to claim 2 wherein the mole fraction of carbon dioxide is about 2.5%.

5. A system according to claim 1 wherein said irradiation means is a laser having a lasing medium containing the same elements as said gas.

6. A system according to claim 1 wherein said irradiation means comprises a laser located remotely from said engine.

7. A system according to claim 6 wherein said engine is disposed on a ship and said irradiation means is disposed on shore.

8. A system according to claim 1 wherein said engine comprises a turbocompressor.

9. A system according to claim 8 wherein said turbocompressor comprises a closed-loop gas path including a turbine, the gas flow output of which is connected to a chamber within which said gas is irradiated, a compressor, the gas flow input of which is connected to said chamber, and a return path between the gas flow output of said compressor and the gas flow input of said turbine within which said gas relaxes.

10. A vehicle propulsion system, comprising:
    propulsion means for propelling said vehicle;
    a turbocompressor for driving said propulsion means, said turbocompressor comprising a closed-loop gas path including:
      a turbine having a shaft connected to said propulsion means for driving said propulsion means;
      a first chamber having its gas flow input connected to the gas flow output of said turbine;
      a compressor having its gas flow input connected to the gas flow output of said chamber;
      a second chamber, having its gas flow input connected to the gas flow output of said compressor, the gas flow output of said second chamber being connected to the gas flow input of said turbine; and
      a gas, confined in said closed loop gas path, having at least one upper vibrational energy level, at least one lower vibrational energy level, and ground state translational energy; and
    irradiation means for irradiating said gas in said first chamber to excite at least a portion of said gas to said upper vibrational energy level;
    said gas being substantially adiabatically compressed in said compressor, allowed to relax in said second chamber so that substantially all of the energy in said gas as it enters said turbine is translational energy, said gas being substantially adiabatically expanded in said turbine performing work on said shaft.

11. A system according to claim 10 wherein:
    said vehicle is an airplane and said propulsive means is a fan or a propeller.

12. A system according to claim 10 wherein:
    said vehicle is a ship and said propulsive means is a screw propeller or a water turbine.

13. A system according to claim 10 wherein:
    said vehicle is a land vehicle and said propulsion means comprises at least one wheel or a track.

14. A system according to claim 10 wherein:
    said vehicle is a space vehicle and said propulsion means comprises a gas pressurization pump connected to said turbocompressor, and at least one gas jet for propelling said space vehicle with pressurized gas from said pump.

15. A method of converting energy into mechanical work, comprising:
    (a) irradiating a confined gas, having at least one upper, vibrational energy level, at least one lower vibrational energy level, and ground state translational energy, with laser radiation which excites at least some of said gas to said at least one upper, vibrational energy level, thereby cooling at least some of said gas;
    (b) compressing said cooled gas substantially adiabatically to a high pressure;
    (c) allowing said high pressure gas to relax whereby energy in said at least one vibrational energy level is converted to said translational energy, thereby warming said relaxed gas; and
    (d) expanding said warmed gas substantially adiabatically in a device mechanically coupled to an external device, thereby to perform work.

16. A method according to claim 15 wherein said gas is a mixture of carbon dioxide and nitrogen.

17. A method according to claim 16 wherein the mole fraction of carbon dioxide is about 1%.

18. A method according to claim 16 wherein the mole fraction of carbon dioxide is about 2.5%.

19. A method according to claim 15 wherein each of said steps is performed on the entire volume of said gas, one step after the other.

20. A method according to claim 19 further comprising:

performing said steps (a) through (d) repetitively.

21. A method according to claim 19 wherein said gas is confined in a cylinder having a piston that moves within said cylinder to perform said compression and said expansion, and is connected to an external device to perform work.

22. A method according to claim 15 wherein said mixture is flowing through a closed gas flow path and each of said steps (a)–(d) is continuously performed on incremental volumes of said mixture.

23. A method according to claim 22 wherein said mixture flows through a path including a turbine connected to an external device to perform work and a compressor.

24. A method according to claim 23 wherein said compressor is driven by said turbine.

25. A method of providing propulsive power to a vehicle, comprising:

(a) irradiating a confined gas, having at least one upper vibrational energy level, at least one lower vibrational energy level, and ground state translational energy, with laser radiation which excites at least some of said gas to said at least one upper, vibrational energy level, thereby cooling said at least some of said gas;

(b) compressing said cooled gas substantially adiabatically to a high pressure;

(c) allowing said high pressure gas to relax whereby energy in said vibrational energy levels is converted to translational energy, thereby warming said relaxed gas; and (d) expanding said warmed gas substantially adiabatically in a device mechanically coupled to an external device, thereby to perform work coupled to said propulsive means, thereby to propel said vehicle.

26. A method according to claim 25 wherein:

said vehicle is an airplane and said propulsive means is a fan or a propeller.

27. A method according to claim 25 wherein:

said vehicle is a ship and said propulsive means is a screw propeller.

28. A method according to claim 25 wherein:

said vehicle is a land vehicle and said propulsion means comprises at least one wheel.

29. A method according to claim 25 wherein:

said vehicle is a space vehicle and said propulsion means comprises a gas pressurization pump connected to said device, and at least one gas jet for propelling said space vehicle with pressurized gas from said pump.

* * * * *